've# 2,723,287

ADDITION OF 1,1 ETHER-ESTERS TO OLEFINS

John W. Copenhaver, Short Hills, N. J., assignor to General Aniline & Film Corporation, New York, N. Y., a corporation of Delaware No Drawing. Application June 29, 1951,
Serial No. 234,446

18 Claims. (Cl. 260—488)

This invention relates to a method of preparing 1,3 ether-esters and derivatives thereof by the direct addition of 1,1 ether-esters to olefin hydrocarbons, and to the products produced thereby.

I have discovered that said ether-esters may be prepared by the direct addition of 1,1 ether-esters (acyloxy or aroyloxy derivatives of hemi-acetals) to hydrocarbons containing an activated ethylenically unsaturated group in the presence of an acid-reacting condensing agent, preferably under substantially anhydrous conditions. The reaction may be formulated as follows:

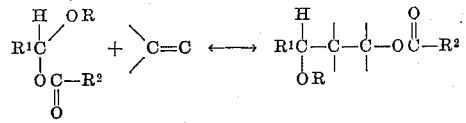

in which R, R¹ and R² are inert monovalent aliphatic, aromatic or alicyclic radicals, preferably hydrocarbon radicals, for example alkyl, aryl, aralkyl, cycloalkyl, and more preferably lower alkyl radicals. The corresponding ether-alcohols and ether-enes may be produced from these ether-esters by saponification and dealcoholization.

It will be noted that this reaction involves a splitting of the acyloxy or aroyloxy group from the 1,1 ether-ester and migration of the resulting radicals of the 1,1 ether-ester to saturate the ethylenic compound thereby producing a mixed 1,3 ether-ester.

As examples of 1,1 ether-esters which may be employed in practicing the present invention may be mentioned the esters of acetic, propionic, butyric, benzoic, hexahydrobenzoic, cyclohexylacetic, phenylacetic acids and the like with alcohols, such as the ethyl, propyl, butyl, allyl, cyclohexyl, benzyl and phenylethyl alcohols, substituted in the alpha position by ether groups such as methoxy, ethoxy, butyloxy, cyclohexyloxy, phenoxy and the like. The lower acyloxy and alkoxy derivatives are preferred, such as alpha methoxy methyl acetate, alpha ethoxy ethyl butyrate, alpha butyloxy propyl acetate, alpha propyloxy butyl propionate and the like. It will, of course, be understood that 1,1 ether-esters substituted by inert radicals which do not interfere with the production of the desired products in the desired reaction are to be included within the scope of the invention and claims.

These 1,1 ether-esters are in general well known and may be produced by the reaction of any of the following components: 1) an organic carboxylic acid and a vinyl ether, 2) an organic carboxylic acid and an acetal, and 3) an acid anhydride and a hemi-acetal. For example, 1,1 ether-esters may be termed esters of hemi-acetals which in turn are derived from the addition of one mol of an alcohol to one mol of an aldehyde in accordance with the following reaction:

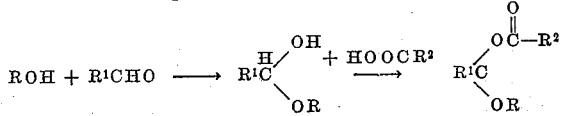

in which R, R¹ and R² have the values given above.

As examples of hydrocarbons containing an activated ethylenically unsaturated group which may be employed in practicing the present invention may be mentioned styrenes, isobutylene, diisobutylene and the like. Thus the term "hydrocarbon containing an activated ethylenically unsaturated group" as employed herein and in the appended claims is intended to denote the foregoing compounds and smilar compounds operative in the present invention in which a carbon atom of said group is joined to two other hydrocarbon radicals in branched chain relationship, or said group is in conjugated relationship with another ethylenicaly unsaturated group. Compounds such as ethylene, propylene, cyclohexene, and the like which do not contain a branched chain or conjugated configuration, have been found to be insufficiently active to undergo the desired addition reaction.

The catalyst employed in practicing the present invention is an acid-reacting condensing agent. As examples of suitable catalysts there may be mentioned such acid-reacting condensing agents as boron trifluoride and its complexes with ether, boron trichloride, gallium trichloride, stannic chloride, titanium chloride, p-toluenesulfonic acid, sulfuric acid and the like. The amount of catalyst is not highly critical and may be varied from mere traces to about 0.1 mol of catalyst per mol of acylal. However, for best results, employing a catalyst like boron trifluoride, amounts within the range of 0.0025 to 0.01 mol of catalyst per mol of acylal are employed.

In general, the catalyst should be added carefully to the 1,1 ether-ester with cooling and stirring to avoid any tendency for the 1,1 ether-ester to disproporitionate to the ethylidene diacylate and the corresponding acetal, viz.

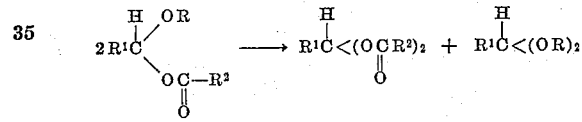

In order to avoid this reaction, it is also necessary to run the addition reaction under generally mild conditions of from about 0 to 35° C.

Generally, anhydrous conditions should be maintained and diluents may be employed, although there is no particular advantage inherent in the use of a diluent. After the reaction has been completed, the catalyst may be neutralized with any base or alkali, although the use of strong alkalies must be controlled to avoid saponification of the ester. Preferably anhydrous solvent-soluble bases of the type of triethanolamine, diethanolamine, ethanolamine, sodium methylate, ammonia, pyridine and the like should be employed. After neutralization the reaction product may be isolated generally by distillation. The use of pressure may be found useful in some cases, as for example, in order to keep a gaseous olefin such as isobutylene in the reaction.

The following examples present specific embodiments of the invention, although it is to be understood that the invention is not to be limited thereby.

*Example 1.—Preparation of the acetate of phenyl-2-methoxy-propyl carbinol*

To 118 g. (1 mole) of α-methoxy ethyl acetate and 3 ml. of boron fluoride etherate were added dropwise 104 g. (1 mole) of freshly distilled styrene. The reaction mixture was then stirred 6 hours at room temperature and the catalyst neutralized. Distillation gave the acetate of phenyl-2-methoxy-propyl carbinol, boiling at 122° C./9 mm., $N_D$ 1.4852.

*Analysis.*—Calc. for $C_{13}H_{18}O_3$: C, 70.23; H, 8.16. Found: C, 69.93; H, 8.35.

The reaction may be formulated as follows:

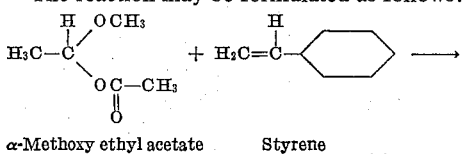

α-Methoxy ethyl acetate     Styrene

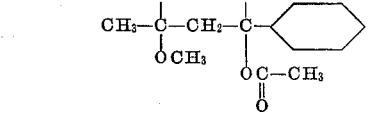

Acetate of phenyl-2-methoxy-propyl carbinol

*Example 2.—Preparation of phenyl-2-methoxy-propyl carbinol*

This example illustrates saponification of the 2,4-ether-ester of the previous example to produce the corresponding 2,4-ether-alcohol.

20 g. of the acetate of phenyl-2-methoxypropyl carbinol were refluxed 6 hours with a solution of 5 g. sodium hydroxide in 50 ml. water. The oily layer was separated, taken up in ether, washed with water, dried and distilled to give phenyl-2-methoxy propyl carbinol, B. P. 93° C./1 mm., $N_D^{25}$ 1.5050.

This product is a secondary alcohol as shown by the fact that it gave a rapid test with $ZnCl_2.HCl$ solution.

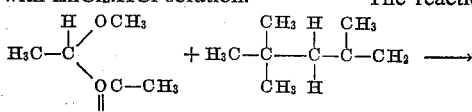

α-Methoxy ethyl acetate diisobutylene

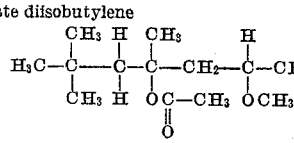

*Example 3.—Preparation of the acetate of 2-methyl-4-methoxypentanol-2*

540 g. (5 mol) of α-methoxyethyl acetate (acylal) were charged to a 1-liter, 3-necked flask fitted with a sealed stirrer, thermometer, gas inlet tube and connected to a dry ice-methanol cooled trap. After cooling to about 5° C., 5 ml. of boron fluoride etherate were added slowly with stirring, then 245 g. isobutylene passed in, keeping the temperature at 5–10° C. After standing overnight, the catalyst was neutralized by addition of ethanolamine and the supernatant liquid decanted and fractionated through a packed column. After removing unreacted isobutylene and acylal, there were obtained, 485 g. of the acetate of 2-methyl-4-methoxypentanol-2- boiling at 74° C./22 mm., $N_D^{25}$ 1.4125.

The reaction may be formulated as follows:

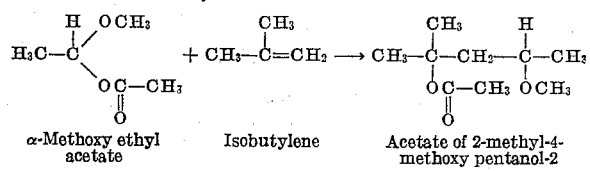

α-Methoxy ethyl acetate    Isobutylene    Acetate of 2-methyl-4-methoxy pentanol-2

*Example 4.—Preparation of 2-methyl-4-methoxy-pentanol-2*

This example illustrates the saponification of the 2,4-ether-ester of the previous example to the corresponding 2,4 ether-alcohol.

174 g. (1 mole) of the acetate of 2-methyl-4-methoxypentanol-2 were added to a solution of 40 g. (1 mole) of sodium hydroxide in 200 ml. of 50% aqueous ethanol. The reaction mixture was refluxed 2 hours, cooled, and the top layer separated and distilled to give a 95 percent yield of 2-methyl-4-methoxypentanol-2, boiling at 157–158° C., $N_D^{25}$ 1.4109, $d_4^{25}$ 0.8758.

This alcohol was characterized by conversion to a 3,5-dinitrobenzoate, M. P. 100.5–102° C.

*Analysis.*—Calc.: C, 63.63; H, 12.12. Found: C, 63.71; H, 12.27.

*Example 5.—Preparation of 2,2,4-trimethyl-6-methoxyheptanol-4*

This example illustrates the production of a 2,4 ether-ester and saponification and dealcoholization to the corresponding 2,4 ether-alcohol and 2-ether-4-ene.

3 ml. boron fluoride etherate were added to 324 g. of α-methoxyethyl acetate which had been cooled to 5° C. 168 g. of diisobutylene were added dropwise over 1.25 hours keeping the temperature at 3–5° C. The reaction mixture was stirred at 0–5° for 5 hours, then let stand overnight in an ice box at about 5–10° C. The solution was then treated with 1200 ml. of 10 percent sodium hydroxide and then refluxed for 2 hours. The organic layer was separated, washed with water and distilled to yield 97 g. of 2,2,4-trimethyl-6-methoxyheptene-3, B. P. 70° C./15 mm., $N_D^{25}$ 1.4283 and 22 g. of 2,2,4-trimethyl-6-methoxyheptanol-4, B. P. 105° C./8 mm., $N_D^{25}$ 1.4421.

*Analysis.*—Calc. for $C_{11}H_{24}O_2$: C, 70.16; H, 12.85. Found: C, 70.84; H, 11.76.

The reaction may be formulated as follows:

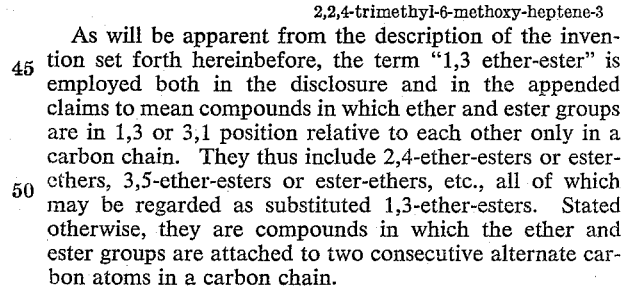

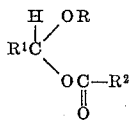

2,2,4-trimethyl-6-methoxy-heptene-3

As will be apparent from the description of the invention set forth hereinbefore, the term "1,3 ether-ester" is employed both in the disclosure and in the appended claims to mean compounds in which ether and ester groups are in 1,3 or 3,1 position relative to each other only in a carbon chain. They thus include 2,4-ether-esters or ester-ethers, 3,5-ether-esters or ester-ethers, etc., all of which may be regarded as substituted 1,3-ether-esters. Stated otherwise, they are compounds in which the ether and ester groups are attached to two consecutive alternate carbon atoms in a carbon chain.

The products of the present invention are useful as chemical intermediates, for example, for saponification to ether-alcohols and the like, as solvents, plasticizers, etc.

My invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

I claim:

1. A process for producing mixed 1,3 ether-esters which comprises reacting, at a temperature of about 0 to 35° C., a compound of the formula:

$$R^1\overset{H}{\underset{\underset{\displaystyle O}{\overset{\displaystyle \|}{O-C-R^2}}}{\overset{\displaystyle OR}{C}}}$$

wherein R, $R^1$ and $R^2$ are selected from the group consisting of alkyl, aralkyl, aryl and cycloalkyl radicals containing no more than about 8 carbon atoms, with an ethylenically unsaturated compound selected from the group consisting of styrene, isobutylene and diisobutylene in the presence of an acid-reacting condensing agent.

2. A process as defined in claim 1 wherein the acid reacting condensing agent is boron fluoride.

3. A process as defined in claim 1 wherein the ethylenically unsaturated compound is styrene.

4. A process as defined in claim 1 wherein the ethylenically unsaturated compound is isobutylene.

5. A process as defined in claim 1 wherein the ethylenically unsaturated compound is diisobutylene.

6. A process which comprises reacting, at a temperature of about 0 to 35° C., a compound of the formula:

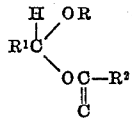

wherein R, $R^1$ and $R^2$ are selected from the group consisting of alkyl, aralkyl, aryl and cycloalkyl radicals containing no more than about 8 carbon atoms, with an ethylenically unsaturated compound selected from the group consisting of styrene, isobutylene and diisobutylene in the presence of an acid-reacting condensing agent to produce a mixed 1,3 ether-ester, and saponifying said ether-ester to the corresponding 1,3 ether-alcohol.

7. A process which comprises reacting, at a temperature of about 0 to 35° C., a compound of the formula:

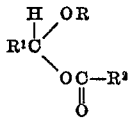

wherein R, $R^1$ and $R^2$ are selected from the group consisting of alkyl, aralkyl, aryl and cycloalkyl radicals containing no more than about 8 carbon atoms, with an ethylenically unsaturated compound selected from the group consisting of styrene, isobutylene and diisobutylene in the presence of an acid-reacting condensing agent to produce a mixed 1,3 ether-ester, and saponifying and dealcoholizing the said ether-ester to the corresponding 1-ether-3-ene.

8. A process for producing the acetate of phenyl-2-methoxy-propyl carbinol by reacting, at a temperature of about 0 to 35° C., alpha-methoxy ethyl acetate with styrene in the presence of boron fluoride.

9. A process comprising reacting, at a temperature of about 0 to 35° C., alpha-methoxy ethyl acetate with styrene in the presence of boron fluoride and saponifying the reaction product thereof to produce phenyl-2-methoxy-propyl carbinol.

10. A process for producing the acetate of 2-methyl-4-methoxy-pentanol-2 by reacting, at a temperature of about 0 to 35° C., alpha-methoxy ethyl acetate with isobutylene in the presence of boron fluoride.

11. The process for producing the acetate of 2,2,4-trimethyl-6-methoxyheptanol-4 by reacting, at a temperature of about 0 to 35° C., alpha-methoxy ethyl acetate with diisobutylene in the presence of boron fluoride.

12. The process comprising reacting, at a temperature of about 0 to 35° C., alpha-methoxy ethyl acetate with diisobutylene in the presence of boron fluoride and saponifying and dealcoholizing the reaction product thereof to produce a mixture of 2,2,4-trimethyl-6-methoxy-heptanol-4 and 2,2,4-trimethyl-6-methoxy-heptene-3.

13. The acetate of phenyl-2-methoxy-propyl carbinol.

14. The acetate of 2-methyl-4-methoxy-pentanol-2.

15. The acetate of 2,2,4-trimethyl-6-methoxyheptanol-4.

16. Phenyl-2-methoxy-propyl carbinol.

17. 2,2,4-trimethyl-6-methoxy-heptene-3.

18. A compound having the formula

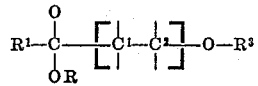

in which $R^3$ is selected from the group consisting of H and

R, $R^1$ and $R^2$ are selected from the group consisting of alkyl, aralkyl, aryl and cycloalkyl radicals containing no more than about 8 carbon atoms and the portion in brackets is the residue of an ethylenically unsaturated compound selected from the group consisting of styrene, isobutylene and diisobutylene.

References Cited in the file of this patent

UNITED STATES PATENTS 2,446,171    Croxall et al. _____ Aug. 3, 1948